United States Patent [19]

Buckley et al.

[11] 4,180,592

[45] Dec. 25, 1979

[54] FOOD PROTEIN PRODUCT

[75] Inventors: Keith Buckley, Melton Mowbray; Alan Vernon, Nottingham; Philip J. Lowe, Bramcote, all of England

[73] Assignee: Mars Limited, London, England

[21] Appl. No.: 820,890

[22] Filed: Aug. 1, 1977

[30] Foreign Application Priority Data

Aug. 2, 1976 [GB] United Kingdom ............... 32169/76

[51] Int. Cl.$^2$ ........................... A23J 1/06; A23L 1/31
[52] U.S. Cl. ....................................... 426/32; 426/261; 426/641; 426/646; 426/647; 426/253
[58] Field of Search ................. 426/32, 253, 261, 641, 426/646, 647, 643

[56] References Cited

U.S. PATENT DOCUMENTS

| | | | |
|---|---|---|---|
| 1,620,458 | 3/1927 | Gelissen | 426/258 |
| 4,060,644 | 11/1977 | Braid | 426/261 |

FOREIGN PATENT DOCUMENTS

| | | | |
|---|---|---|---|
| 47-37543 | 9/1972 | Japan | 426/261 |
| 289804 | 2/1971 | U.S.S.R. | 426/261 |
| 506380 | 5/1976 | U.S.S.R. | 426/261 |

Primary Examiner—Raymond N. Jones
Assistant Examiner—Esther M. Kepplinger
Attorney, Agent, or Firm—Davis, Hoxie, Faithfull & Hapgood

[57] ABSTRACT

Blood, red blood derivatives or blood-containing materials such as liver are decolorized for use in food or animal food products by oxidants such as hydrogen peroxide or calcium or sodium peroxide. Excess peroxide can be removed and a desirable color achieved by adding further blood, blood derivative or meaty material. Reaction with the peroxide can be facilitated by a pH reversal process in which the pH is raised or lowered by at least 2 units and then restored. Heat or a combination of heat and pH reversal can also be employed. Flavors and other additions added to the blood or other material before decolorization are locked in the resulting product. The decolorized material can be canned as a mince-like product or mixed with other foodstuffs.

13 Claims, No Drawings

FOOD PROTEIN PRODUCT

The present invention relates to a process for treating blood to render it more suited for use in animal or human food products, and in a preferred aspect also relates to a process for preparing a food protein product from blood so treated.

Blood has found limited application in the formulation of food products, mainly because of its intense colour. Such limitations apply not only to whole blood, but also to separated red blood cells, dried whole blood, dried red blood cells, and even to meat cuts which have a high blood content, e.g., liver. Attempts to circumvent this problem by adopting a decolorizing process have not met with wide acceptance.

It has been known for a long time, for example from German Pat. No. 105,823, that blood can be decolorized by oxidants such as hydrogen peroxide, although special measures, such as the heating technique described in the said patent, have been found necessary to overcome the problems arising from the catalytic activity of blood for the decomposition of peroxides. Nevertheless, the colour and appearance of conventional decolorized blood is scarcely more acceptable than the almost black colour of undecolorized blood.

We have now found in accordance with this invention that blood can be rendered better suited and more acceptable for general use in food products if it is decolorized with oxidant and then excess oxidant decomposed by mixing with additional blood. While it is preferred that the process now provided is employed to treat whole blood, it is of wide applicability and may be used to treat blood-containing material, e.g., meat cuts or fish with dark flesh, and also to decolorize red blood derivatives such as separated red blood cells, dried whole blood, and dried red blood cells.

Furthermore, while the additional blood used to decompose the oxidant may often be a further sample of the same blood as that subjected to the initial decolorization, for certain purposes it may be of advantage to use blood in a different form. Thus, for example, excess oxidant present after decolorizing whole blood may be decomposed by mixing with chunks of raw meat or fish. The amount and form of the additional blood employed will naturally have to be at least sufficient to decompose the quantity of excess oxidant present, but beyond this it can be varied so as to vary the colour imparted to the resulting product. This variability in colour offers advantages in the preparation of different types of product. Depending on the form of the additional blood employed it may be desirable either to add the additional blood to the decolorized material, or vice versa.

The preferred oxidant for the present process is hydrogen peroxide, which can be added as such or can be generated in situ, for example from sodium or calcium peroxide. Other oxidants, for example sodium persulphate, nascent oxygen, concentrated ozone or sodium percarbonate may be used.

Various techniques may be employed to facilitate the decolorizing reaction between blood and oxidant, though the conditions employed will depend particularly on the oxidant. Except in excessive quantities, dilute hydrogen peroxide does not usually decolorize raw whole blood, as discussed in the German patent mentioned above.

According to a first important aspect of the invention, we subject blood at ambient temperature to a pH change of at least 2, preferably 3 or more, units and thereafter reverse the pH change, preferably back to substantially the original value, in order to facilitate peroxide oxidation. As described below, addition of oxidant coupled with a pH change of less than 2 may be all that is necessary to obtain satisfactory decolorization if the blood is also subjected to heat or other treatment.

The blood to be decolorized will usually have a pH in the range 6-8 and preferred processes thus comprise taking the blood to about pH 3 and back, or to about pH 11 and back. The oxidant will normally be added after pH change, but can be added before or after effecting the pH reversal back to about the original value. Whether oxidant is added before or after the pH reversal, appreciable decolorization will usually only occur after the reversal. A preferred acid is hydrochloric acid, and a preferred alkali is sodium hydroxide.

This "pH reversal" technique readily gives a decolorized material suitable for mixing with unoxidized blood or red blood derivative in accordance with the principal feature of this invention. It can also be used, however, to decolorize blood for other purposes, with or without a specific treatment to remove excess oxidant, or where the excess is decomposed by other and more conventional means. The use of blood or blood-containing materials for this decomposition is particularly advantageous, however, in its cheapness, as well as in the facility with which desirably coloured products can be obtained.

The following are two preferred procedures embodying the pH reversal principle.

(I) Whole blood is made acid (pH 3) with hydrochloric acid to give a precoagulum slurry which is then brought back to pH 6-8 with sodium hydroxide. Hydrogen peroxide is thereafter added with vigorous mixing and after, say, 10 minutes the pale yellow curd obtained is washed with water and processed further as desired.

(II) Whole blood is made alkaline (pH 11) with sodium hydroxide and after 5 minutes is neutralized (pH 6-8) with hydrochloric acid. Hydrogen peroxide is vigorously stirred in and after, say, 15 minutes the product is washed or otherwise treated further, for example by the addition of blood.

In situ generation of hydrogen peroxide from calcium or other alkali or alkaline earth metal peroxides is especially useful as part of the pH reversal process. The addition of the latter peroxides to blood gives an alkaline medium, thus accomplishing the desired pH shift, and neutralisation to restore the pH value (pH reversal) is accompanied by the generation of hydrogen peroxide. 5-10% by weight calcium or other metal peroxide represents a preferred amount.

Instead of or in combination with the pH reversal process, or at the stage of decolorizing by mixing with additional blood in order to destroy excess oxidant, it is possible to use a heat-treatment of the blood.

In this treatment, it is preferred that the blood is heated to at least 65° C., preferably 70° to 100°, before adding the oxidant. It may be possible to use a temperature lower than 65° C. if the pH value of the blood is changed and then restored.

Where this heat treatment is employed at the decolorization stage of a process in which excess oxidant is subsequently decomposed, the decolorized blood is cooled to below 65° C., preferably below 50°, before mixing with the additional blood.

For most processes which employ hydrogen peroxide as oxidant (whether added as such or generated in situ) and including the preferred pH reversal and heat treatment processes, the addition of 3 to 6% of 100-volume hydrogen peroxide (calculated on the weight percentage of whole blood present) gives good results. Preferably the oxidant is added to the blood with rapid mixing and after, say, 5 to 15 minutes additional blood at a level of 2 to 6 wt. %, (calculated as whole blood) is added. Instead of adding whole blood at a level of 2 to 6 wt. %, to the decolorized material, the decolorized material may be mixed with blood containing materials such as meat or offals, for example at a level of 5-60 wt. % based on the mixture.

As has been mentioned previously, it is preferred that the present process is used to treat whole blood. Whole blood, which may be reconstituted dried whole blood and may be with or without anticoagulant, quite surprisingly gives a protein coagulum when decolorized, which can be subjected to further processing. The effect involved is dramatic—whole blood, a dark red liquid, is converted to a pale granular coagulum with a coarse soft texture, and little residual liquid remains. Indeed, the coagulum might be mistaken for minced chicken. The colour can however be varied in the way described above by mixing with additional blood, and a product more nearly resembling minced meat is then obtained.

In accordance with a second important aspect of this invention, we have found that ingredients added to the whole blood prior to decolorization are bound into the coagulum structure and retained therein during subsequent treatment. Not only can the coagulum be treated to remove excess oxidant, for example by the addition of further blood or blood-containing material, but it can also be subjected to the more rigorous conditions of canning, pasteurization, sterilization and other conventional processing.

This feature of bonding of ingredients is particularly notable since it permits organoleptic improvers to be "locked" into the structure of the coagulum. The food protein product so obtained can readily be formulated to have an attractive texture. The organoleptic improver can be employed to improve, among other characteristics, the flavour, texture (juicyness and mouthfeel), aroma and colour of the coagulum.

Typical examples of such improvers are meats, hydrolysed proteins of meat or vegetable origin, fats, oils, hydrophilic colloids, dyes and synthetic flavours. For certain purposes it may not be necessary to decompose excess oxidant in the coagulum, but this decomposition is usually desirable. The oxidant can be decomposed by adding additional blood, or, alternatively, with other materials, e.g., where the oxidant is hydrogen peroxide with catalase, an acid, or sodium metabisulphite.

Suitable levels for examples of organoleptic improvers which can be included in the formulation prior to decolorization are as follows:

|  | Wt. % |
| --- | --- |
| Meat and meat by-products | 0-50 |
| Fats and oils | 0-20 |
| Hydrolysed protein | 0-50 |
| Dyestuffs | 0-5 |
| Flavouring agents | 0-10 |
| Hydrophilic colloids | 0-5 |
| Salt | 0-5 |

The meat and meat by-products is preferably meat offal, e.g., liver. The preferred fat is beef tallow. The addition of fats, oils or hydrophilic colloids represent preferred features since the resultant coagulum has not only an improved flavour but also a juicy texture. An example of a colloid which gives especially satisfactory results is carrageenan, preferably 1-2 wt. %. The addition of salt (up to 5%) also represents a preferred feature as the flavour of the resulting product is enhanced and furthermore the decolorizing effect is sometimes more pronounced, especially when using in situ generation of hydrogen peroxide.

Decolorized blood in accordance with the present invention, whether with or without flavours, can be incorporated to advantage in a wide variety of foodstuffs and animal feedstuffs. It can be used as an ingredient in, for example, dry biscuits, "semi-moist" products (containing 15 to 45 wt. % moisture and with reduced water activity), sausages, patés, burgers, and meat analogue products. If desired it can be dried to a powder and used as a protein supplement.

Various aspects of the present invention will now be described in greater detail by way of example.

EXAMPLE 1—Treatment of raw blood

Raw blood was heated to 70° C. followed by the addition of hydrogen peroxide (4.5 wt. % of 100-vol.) The pale, mainly solid, product was cooled to 40° C. A 5 ml aliquot of the liquor drained from the compressed decolorized material was diluted to 100 ml with distilled water and titrated with 0.1 N potassium permanganate solution. The results obtained showed that the residual hydrogen peroxide was 8.8% of the original hydrogen peroxide addition.

A further 4 wt. % of the same raw blood was then added to the decolorized material to remove the excess hydrogen peroxide. Two minutes later a 5 ml aliquot of the liquor drained from the particulate product was titrated in the same way as before. In this instance the results obtained showed that there was no residual hydrogen peroxide present. Whereas the initial raw blood had a strong off-aroma and a total bacterial count of 250 million colonies per ml, this aroma was absent from the product and the bacterial count was undetectable.

The product obtained by this treatment had the appearance of minced meat. It was employed as a replacement for tripe in a conventional canned petfood formulation. After in-can sterilization and cooling, the food product was found to resemble in colour and texture a control product made with the conventional formulation incorporating tripe. The decolorized particles retained their shape during the processing and had an attractive chewy texture.

EXAMPLE 2—Peroxide removal with meats

A sample of decolorized blood containing excess hydrogen peroxide was prepared as in Example 1. This solid decolorized blood was then incorporated in a meat mix formulation having the following composition:

|  | Wt. % |
| --- | --- |
| Decolorized blood | 14.0 |
| Hashed meat offcuts | 56.0 |
| Gravy | 30.0 |

A 5 ml sample of the supernatant liquid of the formulation was titrated with potassium permanganate after dilution to 100 ml and gave a titration value identical to that given by a 5 ml sample of a formulation not containing the decolorized blood. This result shows that residual peroxide in the decolorized blood is effectively decomposed by the blood present in the meat offcuts.

After formulation, the above composition was heat sterilized in cans. After cooling and opening the can, the product exhibited an aroma and appearance akin to meat off-cuts and gravy alone.

EXAMPLE 3—Decolorization of liver

Beef liver was finely hashed using a mincer fitted with a 4 mm plate. The hashed liver was heated to 100° C. and held at that temperature for 10 minutes. 4.5 wt. % of 100-vol. hydrogen peroxide was stirred in and the mixture left to cool to 40° C. Thereafter 4% raw blood was added to remove residual hydrogen peroxide.

The product so obtained comprised particles which resembled minced meat and had a yellow/brown colour. After sterilization the particles were assessed by a human panel as having a strong liver flavour retained throughout chewing.

EXAMPLE 4—Decolorization of blood/meat mixture

A mix of 70 wt. % blood and 30 wt. % finely hashed maws was heated to 70° C. followed by the addition of 3 wt. % of 100-vol. hydrogen peroxide. The resultant mixture was then cooled to 40° C. and residual peroxide removed by the addition of 4 wt. % raw blood. The product was canned and sterilized and found to resemble cooked minced meat. It had an acceptable meat-like taste which was maintained throughout mastication. In contrast, decolorized blood without maws had a typical blood-product taste.

EXAMPLE 5—Decolorized blood with flavours

A formulation of the following composition was prepared:

|  | Wt. % |
| --- | --- |
| Whole blood | 67.7 |
| Finely hashed liver | 30.0 |
| Monosodium glutamate (MSG) | 0.1 |
| Synthetic flavour | 2.2 |

The liver was hashed by passage through a 4-mm plate. The formulation was heated to 100° C. and maintained at that temperature for 10 minutes. 4.5 wt. % of 100-vol. hydrogen peroxide was then added. The mixture was thereafter cooled to 40° C. and 4 wt. % raw blood added to remove any residual hydrogen peroxide and give a granular pale/brown coagulum. After in-can sterilization, the product resembled cooked minced meat and had a strong but pleasant liver flavour. The flavour was evident throughout mastication.

In addition, the decolorized blood was used as a replacement for tripe in the formulation of a typical semi-moist dog food. As such it formed 20% of the dog food and had a similar appearance and texture to a control product using tripe. When presented to dogs the product was found to be highly palatable and readily accepted.

EXAMPLE 6—Variations on the decolorization process

The following variations (a) to (f) illustrate alternative procedures for the decolorization process.

(a) A sample of whole blood was acidified with 50% hydrochloric acid to pH 3.0 to give a viscous dark brown paste. 4.5 wt. % of 100-vol. hydrogen peroxide was stirred in after the pH of the mix had been brought back to 7.0 by the addition of a solution of sodium hydroxide. Decolorization occurred on neutralization, resulting in fawn, minced meat-like pieces with minimal liquor.

(b) A sample of whole blood was made alkaline to pH 11.5 with sodium hydroxide solution. 4.5 wt. % of 100-vol. hydrogen peroxide was added after the pH of the liquid had been lowered to 7.0 by the addition of 50% hydrochloric acid. Rapid decolorization occurred resulting in pale fawn minced meat-like wet granular pieces.

(c) This variation was performed in the same way as (a) except that calcium tetrahydrogen diorthophosphate was used instead of hydrochloric acid. The product so obtained closely resembled that obtained in (a).

(d) Whole blood was treated with a dispersion of calcium peroxide in water. The resultant pH of the mixture was 11.5, and was lowered to 7.0 by the addition of hydrochloric acid. This lowering of pH resulted in the formation of a viscous pale grey/brown mince-like paste.

(e) This variation was performed in the same way as (d) except that a solution of citric acid was used to replace the hydrochloric acid. As previously with (d), the resultant product was a viscous pale grey/brown mince-like paste.

(f) The process as in (d) and (e) was repeated except that 5% salt was added to the blood prior to addition of calcium peroxide. In this particular instance the solid product was a very pale cream colour after neutralisation, thus demonstrating a marked synergistic effect with salt.

The products as obtained in each of (a) to (f) are suited for use in the various alternative procedures outlined previously. By way of example may be mentioned the decomposition of excess peroxide by further blood addition, and drying the product from (b) to give a pale material which after comminution is a powder usable as a protein supplement.

EXAMPLE 7—Food protein product incorporating carrageenan

A formulation of the following composition was prepared:

|  | Wt. % |
| --- | --- |
| Whole blood | 65.7 |
| Finely hashed liver | 30.0 |
| Carrageenan | 2.0 |
| Synthetic flavour | 2.2 |
| MSG | 0.1 |

The formulation was treated in the same way as that used to process the formulation of Example 5. After in-can sterilization the product had a liver pâte texture. It was assessed by a human tasting panel as having a much more mellow, pleasant liver flavour when compared with the product of Example 5. The flavour was noticeably retained throughout mastication and the texture was remarked upon as more acceptable than that of the product of Example 5, being more juicy.

EXAMPLE 8—Decolorized blood with flavours including fat

A formulation of the following composition was prepared:

|                              | Wt. % |
| ---------------------------- | ----- |
| Blood                        | 40.4  |
| Hashed liver                 | 30.0  |
| Hydrolysed vegetable protein | 2.3   |
| Arachis oil                  | 6.4   |
| Synthetic flavour            | 4.4   |
| MSG                          | 0.2   |
| Beef dripping                | 16.3  |

The liver was finely hashed by passing through a 4-mm plate, and then heated to 80° C. for 10 minutes. The mixture of the ingredients was heated to 70° C. and 4.5 wt. % of 100-vol. hydrogen peroxide was stirred in. The mix was then left to cool to 40° C. before the addition of 4 wt. % raw blood so as to remove any residual hydrogen peroxide. The coagulum so obtained was mixed with water in the ratio of 2 parts to 1 part, and sterilized in cans. After sterilization the product resembled cooked minced meat and had a strong liver/beef dripping flavour. The flavour was retained throughout mastication.

EXAMPLE 9—Decolorization of autolysed meats

A sample of beef liver was allowed to autolyse until liquid. This liquid was then subjected to the same decolorization process as used in Example 3. After in-can sterilization the product had a stronger liver aroma and flavour than that obtained in Example 3.

We claim:

1. A process of making a food product from whole blood or blood derivatives containing red cells or animal tissue containing such blood comprising the steps of:
   treating said blood or derivative or tissue with an oxidizing agent in excess of the amount necessary for complete decolorizing reaction with said blood or derivative or tissue; and
   decomposing the residual oxidizing agent remaining after said decolorizing reaction by adding whole blood or red blood derivatives or blood-containing animal tissue to the reacted mixture of said first mentioned blood or derivative or tissue and oxidizing agent.

2. A process according to claim 1 in which the oxidizing agent is added to blood or derivative or tissue to which a flavouring or other organoleptic agent has been added.

3. A process according to claim 1 in which before, during or after the addition of the oxidizing agent the blood or derivative or tissue is subjected at ambient temperature to a change of pH value of at least 2 units, either in the acid or alkaline direction, followed by a reverse change in pH value of at least 2 units.

4. A process according to claim 1 in which the blood or derivative or tissue is heated to a temperature of at least 65° C. before the oxidant is added.

5. A process according to claim 1 in which hydrogen peroxide is added in an amount of 3 to 6% of the weight of the blood or equivalent blood content of the derivative or tissue calculated as whole blood.

6. A process according to claim 1 in which calcium or other alkali or alkaline earth metal peroxide as oxidising agent is added in an amount of 5 to 10% by weight of the blood or equivalent blood content and the mixture is subsequently neutralized by the addition of acid.

7. A process according to claim 1 in which the excess is decomposed by adding from 2 to 6% whole blood based on the weight of decolorized material, or the equivalent amount of blood derivative or tissue.

8. A process according to claim 1 in which the product is sealed in cans and sterilized.

9. A process of making a food product from whole blood or blood derivatives containing red cells or animal tissue containing such blood in which the blood or derivative or tissue is decolorized by treatment with excess oxidizing agent comprising calcium or other alkali or alkaline earth metal peroxide added in an amount of 5 to 10% by weight of the blood or equivalent blood content and the mixture is subsequently neutralized by the addition of acid, in which process the excess peroxide is decomposed by adding from 2 to 6% whole blood based on the weight of decolorized material, or the equivalent amount of blood derivative or tissue.

10. In the process of making a food product from whole blood or blood derivatives containing red cells or animal tissue containing such blood in which the blood or derivitive or tissue is treated with a peroxide oxidising agent in an amount in excess of that necessary for decolorizing reaction with said blood or derivative or tissue, the improvement which comprises:
    subjecting said blood or derivative or tissue either before, during or after the addition of said oxidising agent to a change of pH value of at least two pH units followed by a reversed change of pH value of at least two pH units in the direction opposite to said first mentioned change, and decomposing residual oxidising agent by adding whole blood or red blood derivative or blood-containing animal tissue to the mixture of blood and oxidising agent.

11. A process according to claim 10 in which the oxidizing agent is added to blood or derivative or tissue to which a flavouring or other organoleptic agent has been added.

12. A process according to claim 10 in which the blood or derivative or tissue is heated to a temperature of at least 65° C. before the oxidant is added.

13. A process according to claim 10 in which the product is sealed in cans and sterilized.

* * * * *

UNITED STATES PATENT AND TRADEMARK OFFICE
CERTIFICATE OF CORRECTION

PATENT NO. : 4180592
DATED : December 25, 1979
INVENTOR(S) : Keith Buckley, Alan Vernon and Philip J. Lowe It is certified that error appears in the above—identified patent and that said Letters Patent are hereby corrected as shown below:

Column 3, line 53, after "catalase" change "an" to-- as--

Column 8, line 14, before "is" insert-- oxidising agent--

Signed and Sealed this

Tenth Day of March 1981

[SEAL]

Attest:

RENE D. TEGTMEYER

Attesting Officer     Acting Commissioner of Patents and Trademarks